United States Patent [19]

Hoff

[11] 4,148,141
[45] Apr. 10, 1979

[54] LAWN TRIMMER CUTTER HEAD

[75] Inventor: Stephen J. Hoff, Richmond, Ind.

[73] Assignee: Hoffco, Inc., Richmond, Ind.

[21] Appl. No.: 878,719

[22] Filed: Feb. 17, 1978

[51] Int. Cl.$^2$ .................... A01D 35/26; A01G 3/06
[52] U.S. Cl. ........................................ 30/276; 56/12.7
[58] Field of Search ................. 30/276, 347; 56/12.7, 56/295

[56] References Cited

U.S. PATENT DOCUMENTS

| 3,859,776 | 1/1975 | Ballas et al. ........................ 56/12.7 |
| 4,114,269 | 9/1978 | Ballas, Sr. ........................... 30/276 |

FOREIGN PATENT DOCUMENTS

| 6919841 | 10/1969 | Fed. Rep. of Germany ............ 56/12.7 |
| 6938265 | 1/1970 | Fed. Rep. of Germany ............ 56/12.7 |

*Primary Examiner*—Jimmy C. Peters
*Attorney, Agent, or Firm*—Jenkins, Coffey, Hyland, Badger & Conrad

[57] ABSTRACT

A rotary cutter head for a lawn trimmer or the like has a die cast head body comprising a top circular wall and a depending hub, with a plate riveted to the bottom of the hub for forming a spool to receive a winding of flexible cutting line such as monofilament nylon. A peripheral depending skirt on the circular wall is segmented by spaced downward open notches defined at their axial sides and their tops by convex faces, so as to form line apertures. A molded bottom glide cup has its cylindrical side wall inside and spaced from the segmented skirt by a distance less than the line thickness, with its top edge close below the tops of the notches. The body is mounted on a drive arbor by a nut seated in and removable by manual rotation of the glide cup relative to the body.

The cutting line end extends from the winding, over the cup wall edge, through the top of the notch, and then outward in a free length which forms the cutting element. Such wall edge and notch top confine the line to a predetermined plane of rotation, i.e., cutting plane, regardless of axially where on the winding the free length is connected. When the cutting length of the line is worn and needs renewing, it is pulled down out of the notch and against the cup side wall and then pulled circumferentially in the space between that wall and the surrounding segmented skirt to another notch. The space is narrower than the line thickness and the cup is made stiff but yieldable to pass the line through the space.

15 Claims, 4 Drawing Figures

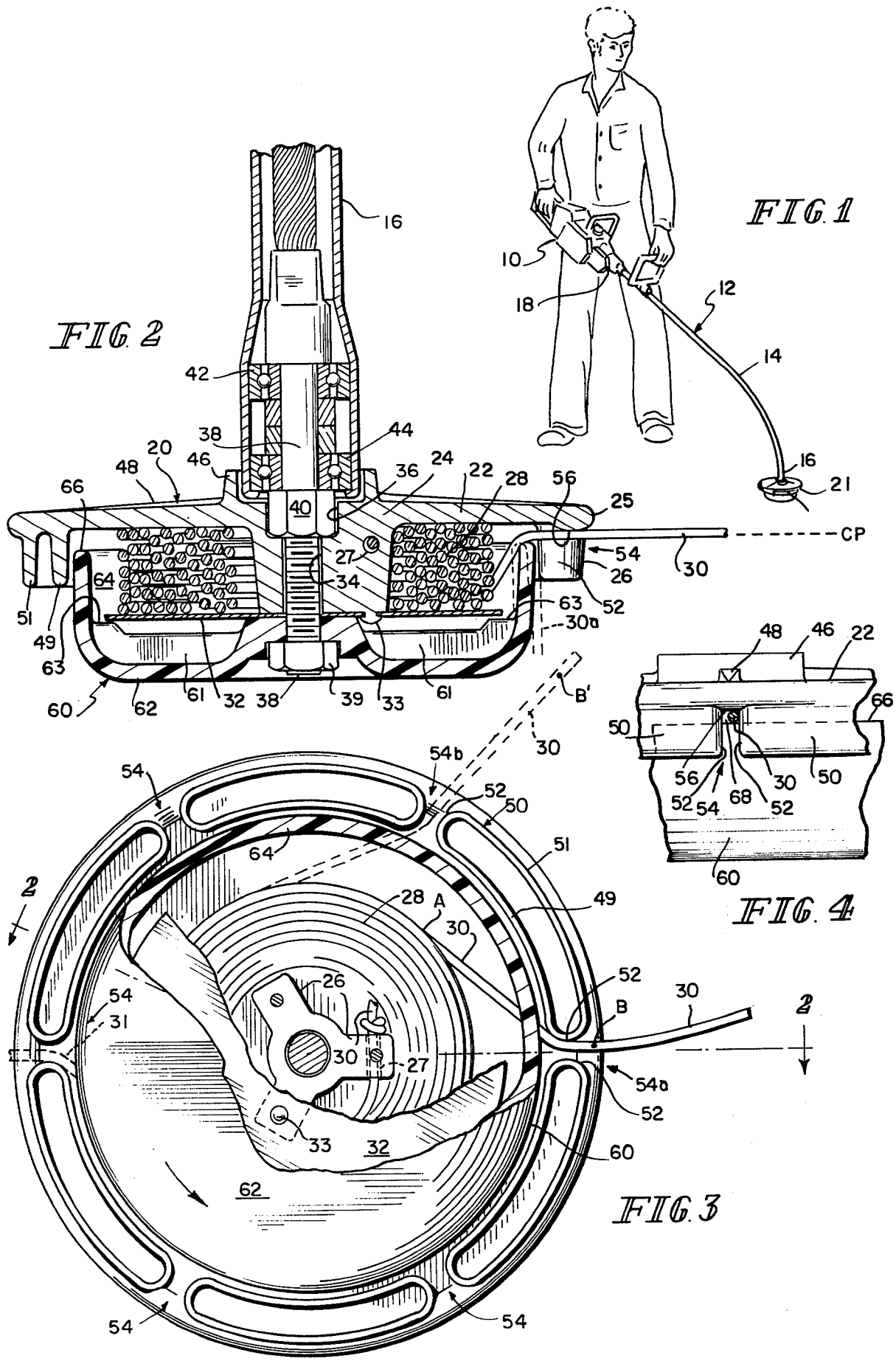

LAWN TRIMMER CUTTER HEAD

This invention relates to a rotary cutter head for a lawn trimmer or the like having a cutting element formed by a free-swinging length of flexible line, such as a length of monofilament nylon line.

There are a number of implements of this type on the market, from a number of manufacturers, for use in lawn trimming, edging, sweeping, clearing, etc. These are exemplified by the Ballas and Geist U.S. Pat. Nos. 3,708,967; 3,826,068; and 3,859,777, and by the prior German Gebrauchsmuster or Petty Pat. No. 6,919,841. As indicated in those patents, an implement of this type presents a number of problems, and cutter heads of various designs have been proposed. It is the object of the present invention to provide an improved cutter head, especially for light-duty work, which is of relatively simple and inexpensive construction but which provides highly effective operation and a convenient means of storing reserve cutting line and of extending such line to renew the free-swinging length thereof which serves as a cutting element for the head.

In accordance with the invention, a preferred form of rotary cutting head comprises an inverted generally cup-shaped body having a top circular wall, a central depending hub, and a depending peripheral skirt which is segmented by spaced downward-open notches. The central hub carries a bottom plate, and such plate and the top body wall and the hub form a spool to receive a winding of flexible cutting line such as monofilament nylon. The notches in the segmented skirt are defined at their axial sides and their tops by convex faces, so as to form line apertures to pass the cutting line from the winding outward to a free-swinging cutting end. A bottom glide cup has its cyclindrical side wall inside and closely spaced from the segmented skirt, with its top edge close below the tops of the notches. The body is mounted on a suitable drive shaft or arbor and held by a nut which may also hold the glide cup in place. Conveniently, the nut is seated in the glide cup so as to be removable by manual rotation of the glide cup relative to the body.

The cutting line extends from the winding on the hub tangentially and axially as necessary to the upstanding edge of the glide cup, through the top of the notch, and thence outward in a free length which forms the cutting element. Such wall edge and notch top confine the line to a predetermined plane of rotation which constitutes the cutting plane of the head, regardless of where along the axial length of the winding the line leaves such winding. When the cutting length of the line is worn and needs renewing, it is pulled down out of the notch against the cup side wall, and then pulled circumferentially in the space between that wall and the surrounding segmented skirt, to another notch. The space between the cup wall and the skirt is desirably slightly narrower than the line thickness, and the glide cup is desirably made of stiff but somewhat resilient plastics material so that the cup side wall can flex inward as the line is pulled between it and the overlapping skirt segment. The top edge of the cup wall is desirably rounded, and the yieldable wall provides a somewhat resilient support for the line, especially when the stretch of line between the winding and that edge extends in a direction which has a substantial axial component.

The accompanying drawings illustrate the invention and show a preferred embodiment representing the best mode of carrying out the invention as presently perceived. In such drawings:

FIG. 1 is a pictorial view showing a lawn trimming implement carried in a position of use by an operator and fitted with a cutting head in accordance with the present invention;

FIG. 2 is an axial cross section of a head in accordance with the invention mounted on a drive arbor at the bottom of the frame shaft of the implement shown in FIG. 1;

FIG. 3 is a bottom plan view of the head shown in FIG. 2 with parts broken away; and FIG. 4 is a fragmental side elevation, from the left of FIGS. 2 and 3.

The implement shown in FIG. 1 comprises a power head 10 from a lightweight chain saw and a conversion attachment 12 attached thereto, as more fully disclosed in my copending application Ser. No. 871,603, filed Jan. 23, 1978. The conversion attachment comprises a frame shaft tube 14 which extends forward and downward from the power head 10 and thence through a bend to a generally vertical lower end 16 on which a rotary cutter head 21 is mounted for rotation about the axis of the lower shaft end 16. The head 21 is driven by a flexible drive shaft housed within the frame tube 14 and driven through a conversion gear head 18 connected to the power head 10.

As shown in FIGS. 2 and 3, the head comprises a body 20 having the general configuration of an inverted shallow cup, with a top radial wall 22 extending from a hub 24 outward to a depending peripheral skirt 26. The hub 24 extends downward from the top wall 22 and is formed with three axially extending spider ribs 26 which together form the drum portion of a spool to receive a winding 28 of cutting line 30. One flank of the spool is formed by the top wall 22, and the opposite or bottom flank is formed by a circular plate 32 fastened against the bottom end face of the hub 24. Conveniently, the body 20 is a die casting, and the bottom end of the hub is formed with three integral rivet studs 33 which are riveted over to hold the plate 32 permanently in place.

The hub 24 is formed with a central bore 34 having a hexagonal or other non-circular socket 36 at its upper end. The bore and socket are received over a threaded arbor 38 having a drive nut 40 to engage the socket 36. The arbor is mounted in a pair of ball bearings 42 and 44 fixed in a flared portion of the lower end 16 of the frame tube 14. The top wall 22 of the body 20 desirably carries a collar 46 standing about the lower edge of the bearing mounting tube. Such wall may also carry a series of angularly spaced radial stiffening ribs 48. The outer circumference of the top wall 22 desirably extends a short distance beyond the outer surface of the segmented skirt 26 to form a bump ring 25 to protect the line from being pinched between the head and a stationary object.

The skirt 26 of the body 20 extends downward not more than about half the length of the winding, to leave winding clearance. It is formed as six cored segments 50 having inner walls 49 and outer walls 51 and end walls with convex faces 52. The segments 50 are spaced to define between them notches 54. The notches 54 have convex vertical side faces, formed by the end faces 52 of the segments 50. The tops of the arches are formed by surfaces 56 which are convex in a radial direction as shown in FIG. 2 and straight in a circumferential direction as shown in FIG. 4. The notches thus define apertures which are generally rectangular in elevation.

The cutter head also comprises a glide cup 60 having a central hub portion which forms a retaining seat for a nut 39 threaded onto the arbor 38 to hold the body 20 and cup 60 together and fixed on the arbor 38. The glide cup 60 has a rounded bottom wall which forms a glide surface to support and protect the rotary head as it moves over the ground in use. The glide cup also has an outer cylindrical wall 64 which extends axially up inside and inwardly spaced from the inner face of the skirt 26 so that the two overlap over a substantial vertical distance.

The bottom of the glide cup 60 is desirably reinforced with a series of angularly spaced ribs 61 which extend from the hub to the side wall 62 of that cup. At their outer ends, such ribs 61 have top lands 63 which lie close below and underlap the periphery of the plate 32 so as to close the space between the periphery of that plate 32 and the wall 64 and thereby prevent loose coils of the line 30 from falling below the plate 32.

As shown in FIG. 4, the top edge 66 of the glide cup 60 lies close below the top convex surfaces 56 of the notches 54, and such edge 66 and the notch faces 52 and 56 define windows 68 through one of which the cutting line 30 emerges from the storage space between the two cups 20 and 60, containing the winding 28 of reserve cutting line 30. The glide cup edge 66 at the bottom of that window and the notch top surface 56 at the top of that window define a predetermined plane of rotation for the free cutting end of the cutting line 30, and thus define and fix the cutting plane of the rotary head as the plane between the glide cup edge 66 and the notch top surfaces 56. As will be obvious from FIG. 2, most of the reserve line 30 will be stored in the winding 28 at levels outside that defined cutting plane indicated by the line CP in FIG. 2. Accordingly, when the line 30 leaves the winding 28 at a level below the plane CP, as at the point A in FIG. 3, such line will extend in a tangential plane from the winding 28 as shown in FIG. 3, but will have an upward component of direction in that plane, as shown in FIG. 2, in order to reach the top edge 66 of the glide cup 60 and to extend outward therefrom through the window 68 in the predetermined cutting plane CP. To reduce the sharpness of the bend from the angled portion of the line to that plane, the top edge 66 of the glide cup is desirably rounded.

As is known, in the operation of a device of this type, the free-swinging end of the line 30, which forms the cutting element of the head, progressively wears away and must be renewed. The present invention provides for convenient renewal from the winding 28 of reserve line. To effect such renewal and extend the free end of the line 30, such free end is manually pulled from its position in the cutting plane CP downward against the side wall 64 of the glide cup 60, as indicated by the line 30a shown in dotted lines in FIG. 2. The line 30a is then pulled circumferentially through the space between the cylindrical wall 64 of the glide cup 60 and the inner wall 49 of the adjacent skirt segment 50 to another notch 54 where it is again swung upward to the cutting plane CP. As shown in FIG. 3, such operation may carry the line 30 from the notch 54a in the plane of line 2—2, counterclockwise to the next adjacent notch 54b, where the line is shown in dotted lines. This will extend the line by a substantial increment, depending upon the diameter of the winding 28. As shown in FIG. 3, this operation carries the point B on the line 30 shown in full lines to the point B' on the lines shown in dotted lines.

The head body 20 is desirably an aluminum die casting and the glide cup a molding of stiff resilient plastics material. The cutting line used may be any of the plastics lines presently available on the market, for example, monofilament nylon line. In an exemplifying embodiment, the head was five inches in diameter, the line used was nylon monofilament having a diameter of 0.080 inch, and the freeswinging end forming the cutting element was from five to seven inches in length. The power head drove the cutting head at about 4,000 r.p.m.

The head is conveniently assembled as follows: With the glide cup 60 removed from the head body 20, and conveniently with the body removed from the arbor 38, a reserve length of cutting line 30 is secured to one of the spider ribs 26 of the hub by passing its end through a hole 27 in one of the ribs 26 of the hub and then winding it on the spool formed by the hub and its flanking walls 22 and 32. The free end of the line is laid in one of the notches with enough line extending outward to form the cutting element, for example five to seven inches. The head 20 is then slipped on the arbor 38 and engaged with the drive nut 40, and the glide cup 60, with the nut 39 seated therein, is threaded onto the end of the arbor 38. This forms an assembly as shown in the drawings, ready for use..

In use, rotation of the head causes the free end of the line to stand out from the head and swing in the cutting plane defined by the windows 68 between the top edge of the cup wall 64 and the top portions of the notches 54. Such free-swinging line end forms a cutting element to perform such operations as lawn trimming and edging, clearing and sweeping vegetation from around the base of trees and posts, etc. The plane in which the line swings, i.e. the cutting plane CP, has a predetermined position axially of the head, regardless of where along the length of the winding the line leaves that winding in the stretch leading to the notch 54. The cutting plane is spaced above the bottom of the drive cup 60 at a favorable height for lawn trimming operations as the glide cup glides over the lawn. Also, the bottom portion of the cup is exposed for grasping by the hand for purposes of tightening and removing the nut 59, and the side wall of the cup underlaps the skirt of the head over less than half its freestanding height so that its underlapping portion can be made stiff but resiliently yieldable inward from that skirt for purposes of lengthening the cutting length of line 30 as described above, by moving the free end from one notch to another.

The spacing between the notches is such that movement of the line from one notch to the next will lengthen the line by an increment sufficient to re-establish the desirable cutting length of the line. In the exemplifying embodiment, such increment was about an inch and a half, more or less, depending upon the size of the winding 28 remaining on the hub.

When the line in the winding is used up, it can be readily replaced by manually rotating the glide cup 60 relative to the head 20 to remove the nut 39 and the cup, and by winding a fresh length of line 30 on the spool of the body 20 as before.

The rotary head shown and described is provided with only one free swinging line 30 forming only a single cutting element. The head is readily adapted, however, to be provided with a plurality of cutting elements, up to a total equal to the number of notches in the skirt of the head. With more cutting elements, it will ordinarily be desirable to increase the power with which the head is driven since more cutting elements will increase the work done. A second cutting element may be provided, for example, by winding two cutting lines 30 on the spool of the body and then leading the free end of the second line out through a notch diametrically opposite from the first line, as indicated by the line 31 shown in dotted lines in FIG. 3. Each free end will act as a cutting element, and may be renewed or lengthened in the same way as described above for the single line.

I claim:

1. A rotary cutter head for a lawn trimmer or the like comprising
    a cup-shaped body having a top wall and a depending peripheral skirt, said skirt containing a series of circumferentially-spaced downward-open notches,
    a bottom cup having a bottom wall spaced from the top wall of the body and having an upstanding side wall extending toward said top wall in inside lapping relation with said depending skirt,
    the free edge of the side wall being disposed at a level adjacent the tops of the downward open notches,
    means for storing reserve line between the cup-shaped body and bottom cup, with an end of such line extending from the stored line to and across the free edge of the bottom cup and thence outward through the top of a notch, the free edge of the side wall and the top of the notch confining the extended line for rotation in a predetermined plane.

2. A rotary cutter head as in claim 1 in which the free edge of the side wall is spaced axially a short distance below the tops of the notches so as to define with such notches radially-open line-passing windows for passage of the cutting line from the stored line to the extended cutting end.

3. A rotary cutter as in claim 2 in which the tops of the notches form a rectangular opening defined by convex walls.

4. A rotary cutter head as in claim 1 in which the space between the free edge of the side wall and the depending skirt is sufficient to permit the line to be pulled out of its notch and against the side wall and thence circumferentially between the side wall and skirt to another notch to lengthen the projecting length of the line end.

5. A rotary cutter head as in claim 2 in which the space between the free edge of the side wall and the depending skirt is sufficient to permit the line to be pulled out of its notch and against the side wall and thence circumferentially between the side wall and skirt to another notch to lengthen the projecting length of the line end.

6. A rotary cutter head as in claim 5 in which the space between the side wall and the skirt is less than the thickness of the line and such wall is resiliently yieldable to pass the line through the space from one notch to another.

7. A rotary cutter head as in claim 5 with the addition of a flanking plate spaced axially from the top wall of the body and means extending between such plate and wall to receive a winding of reserve cutting line.

8. A rotary cutter head as in claim 7 in which said last named means is a hub integral with the body and the flanking plate is fixed on such hub.

9. A rotary cutter head as in claim 7 in which the bottom cup is formed with portions which lie sufficiently close to the bottom face of the flanking plate at its periphery to prevent escape of reserve line past such plate.

10. A rotary cutter head as in claim 7 in which the body skirt extends axially not more than about half the length of the reserve-line receiving means so as to provide winding clearance, and said cup side wall extends substantially more than half such length into lapping relation with the skirt so as to define a closed storage chamber and retain the reserve line therein.

11. A rotary cutter head as in claim 1 in which the body is formed with a bore for mounting on a drive shaft, axially separable drive means between the body and shaft, and a nut engageable with the end of the shaft, said nut being non-rotatably seated in said bottom cup and the bottom cup being exposed beyond the skirt for manual grasping to rotate the cup relative to the body so as to rotate the nut on and off the shaft.

12. A rotary cutter head for a lawn trimmer or the like comprising
    a first member of inverted cup shape having a top wall and a depending peripheral skirt which is segmented by a series of angularly-spaced, downward-open notches,
    a second cup-shaped member having a bottom wall and upstanding side wall, nested in the first member with such side wall extending inside and in axially-lapping relation with said skirt,
    the upper edge of said side wall lying close below the tops of the notches and therewith defining a peripheral series of line passing windows, and
    means for storing reserve cutting line between said members, with one end of such line extending through one of said windows as a free-swinging cutting element.

13. A rotary cutting head as in claim 12 in which there is a radial space between the skirt and upstanding wall adapted to pass the line from one notch to another when the end of the line is first pulled down against the side of the side wall and thence circumferentially.

14. A rotary cutting head as in claim 12 in which the radial space between the skirt and upstanding wall is less than the thickness of the line, and the wall is yieldable to pass the line through such space.

15. A rotary cutting head for a lawn trimmer or the like comprising
    a body having a top wall, a hub extending axially therefrom,
    a retainer on said hub to form with the hub and top wall a spool-like receptacle for reserve cutting line,
    said body also having a peripheral skirt extending axially along part of the length of the spool so as to leave clearance for winding the same, at least one downward-open notch in the peripheral skirt which defines an aperture for the passage of the free end of the cutting line outward to form a cutting element,
    a cup-shaped member removably assembled to said body to enclose said spool and having an upstanding side wall extending inside said skirt in lapping relation so as to cross the open lower end of the notch and retain the line in the closed upper end thereof.

* * * * *